United States Patent
Engel et al.

(10) Patent No.: US 11,226,588 B2
(45) Date of Patent: Jan. 18, 2022

(54) MULTIPLE OFFSET INTERFEROMETER

(71) Applicant: Siemens Healthcare GmbH, Erlangen (DE)

(72) Inventors: Thomas Engel, Aalen (DE); Oliver Hayden, Moosburg (DE)

(73) Assignee: Siemens Healthcare GmbH, Erlangen (DE)

( * ) Notice: Subject to any disclaimer, the term of this patent is extended or adjusted under 35 U.S.C. 154(b) by 302 days.

(21) Appl. No.: 16/336,890

(22) PCT Filed: Sep. 29, 2017

(86) PCT No.: PCT/EP2017/074769
§ 371 (c)(1),
(2) Date: Mar. 26, 2019

(87) PCT Pub. No.: WO2018/060420
PCT Pub. Date: Apr. 5, 2018

(65) Prior Publication Data
US 2019/0250560 A1   Aug. 15, 2019

(51) Int. Cl.
*G03H 1/00* (2006.01)
*G03H 1/04* (2006.01)
(Continued)

(52) U.S. Cl.
CPC .............. *G03H 1/0005* (2013.01); *G01B 9/02* (2013.01); *G01B 9/021* (2013.01); *G01B 9/02047* (2013.01); *G01B 9/04* (2013.01); *G03H 1/0443* (2013.01); *G03H 1/0866* (2013.01); *G03H 1/265* (2013.01); *G03H 2001/005* (2013.01); *G03H 2001/0216* (2013.01); *G03H 2001/0445* (2013.01); *G03H 2001/0452* (2013.01); *G03H 2001/0456* (2013.01); *G03H 2001/0875* (2013.01); *G03H 2001/0883* (2013.01);
(Continued)

(58) Field of Classification Search
CPC ......... G01B 9/02098; G03H 2001/005; G03H 2001/0452; G03H 2001/0456; G03H 2223/22; G03H 2227/03
See application file for complete search history.

(56) References Cited

U.S. PATENT DOCUMENTS 3,958,884 A   5/1976   Smith
7,046,436 B2   5/2006   Danz et al.
(Continued)

FOREIGN PATENT DOCUMENTS

CN   102576209 A   7/2012
CN   104704406 A   12/2015
(Continued)

OTHER PUBLICATIONS

Cai, Q. et al.: "Study on Polarization Character of Light in PS-OCT System"; Dec. 31, 2011.
(Continued)

*Primary Examiner* — Michael A Lyons
(74) *Attorney, Agent, or Firm* — Dugan & Dugan, PC (57) ABSTRACT

The invention relates to a device, such as a digital holographic microscope, for detecting and processing a first full image of a measurement object, measured with a first offset, wherein an arrangement is provided for generating at least one further full image with at least one offset that differs from the first offset.

14 Claims, 8 Drawing Sheets

(51) Int. Cl.
  *G03H 1/08* (2006.01)
  *G03H 1/26* (2006.01)
  *G01B 9/02* (2006.01)
  *G01B 9/021* (2006.01)
  *G01B 9/04* (2006.01)
  *G03H 1/02* (2006.01)

(52) U.S. Cl.
  CPC ... *G03H 2001/267* (2013.01); *G03H 2222/45* (2013.01); *G03H 2223/20* (2013.01); *G03H 2223/22* (2013.01); *G03H 2227/03* (2013.01)

(56) References Cited

U.S. PATENT DOCUMENTS

| | | | |
|---|---|---|---|
| 2008/0002897 A1 | 1/2008 | Koppa et al. | |
| 2012/0200901 A1 | 8/2012 | Dubois et al. | |
| 2015/0049343 A1* | 2/2015 | Shaked | G01B 9/02054 356/503 |
| 2015/0304616 A1* | 10/2015 | Tada | H04N 9/3191 348/189 |
| 2015/0331167 A1 | 11/2015 | Escuti et al. | |
| 2016/0259158 A1 | 9/2016 | Girshovitz et al. | |
| 2016/0265900 A1* | 9/2016 | Yang | G01L 1/24 |
| 2017/0350690 A1* | 12/2017 | Hatahori | G01N 29/045 |

FOREIGN PATENT DOCUMENTS

| | | |
|---|---|---|
| DE | 2518047 A1 | 11/1975 |
| DE | 10219804 A1 | 11/2003 |
| TW | 200823895 A | 6/2008 |
| WO | WO 9102215 A1 | 2/1991 |
| WO | WO 2004068066 A2 | 8/2004 |

OTHER PUBLICATIONS

Hecht, E.: "Optik"; Oldenbourg Verlag Munich Vienna; 3rd completely revised edition; pp. 504-505; Copyright 1998 Addison Wesley Longman, Inc., USA; original published in 1998.
Hecht, E.: "Optics"; 5th Edition pp. 1-4; Copyright 2016, Pearson. Originally published as Hecht, E.: "Optik"; 3rd edition, pp. 359-361; Copyright 1998 Addison Wesley Longman, Inc., USA; 1998.
Shaked, N. et al.: "Dual-interference-channel quantitative-phase microscopy of live cell dynamics"; Opticals Letter; Optical Society of America; Mar. 15, 2009; vol. 34; No. 6; pp. 767-769; 2009.
Search Report of related Chinese application 201780060856X dated Oct. 30, 2020.
Das Bhargab et al.: "Parallel-quadrature phase-shifting digital holographic microscopy using polarization beam splitter", Optics Communications, Nov. 1, 2012, vol. 285, No. 24, pp. 4954-4960.
Colomb Tristan et al.: "Polarization microscopy by use of digital holography: Application to optical-fiber birefringence measurements", Applied Op, Optical Society of America, Washington, DC; US, Jul. 20, 2005, vol. 44, No. 21, pp. 4461-4469.
Yuan Caojin et al.: "Resolution improvement in digital holography by angular and polarization multiplexing", Applied Optics, Optical Society of America, Washington, DC; US, Mar. 1, 2011, vol. 50, No. 7, pp. B6-BII.
Tahara Tatsuki et al.: "Parallel phase-shifting dual-illumination phase unwrapping", Optical Review, Springer, Berlin, DE, vol. 19, No. 6, pp. 366-370.
International Search Report of International Application No. PCT/EP2017/074769 dated Oct. 1, 2018.
German Search Report of German Application No. DE201610219018 dated Jul. 7, 2017.

* cited by examiner

MULTIPLE OFFSET INTERFEROMETER

CROSS REFERENCE TO RELATED APPLICATIONS

This is a 371 of PCT/EP2017/074769, filed Sep. 29, 2017, which claims priority to German Patent Application No. DE 10 2016 219 018.0, filed Sep. 30, 2016, which is hereby incorporated by reference herein in its entirety for all purposes.

FIELD

The invention relates to apparatuses and methods for extending a uniqueness range in the ease of measurements, in particular, in the case of holographic or interferometric measurements, particularly using a digital holographic microscope.

The present invention relates to an apparatus and a method for capturing and processing a full image of a measured object, which can equally be referred to as test object, in particular, of a cell structure or an object to be tested, in particular, a digital holographic microscope DHM.

BACKGROUND

Conventionally, an application of a concept of a synthetic wavelength is implemented from an evaluation of images with two or more different wavelengths.

A large depth measurement range is advantageous for effectively measuring cells and cell agglomerates in 3D. A large depth measurement range is also advantageous if solids in fluids, for example, bodily fluids and/or secretions, should also be captured in addition to cells. The depth measurement range is restricted to one wavelength in a single wavelength interferometer. Therefore, a second, slightly different wavelength is often added for the purposes of increasing the measurement range. Thus, two independent interferograms are recorded. The uniqueness range of the measurement for the combined synthetic wavelength lies at the smallest common multiple of the wavelengths, divided by the difference of the wavelengths. This procedure is described by the phrase "synthetic wavelengths."

SUMMARY

It is an object of the invention to improve capturing devices, in particular, digital holographic microscopes (DHM), and, in particular, image processing methods associated therewith in such a way that a uniqueness range in measurements, in particular, in holographic measurements, is improved. In particular, depth or thickness information of test objects should be obtained.

This object is achieved by an apparatus as claimed in the main claim and a method as claimed in the alternative independent claim.

According to a first aspect, an apparatus, e.g., an interferometer or a digital holographic microscope, for capturing and processing a first full image of a test object that was measured with a first offset is proposed, including a device for producing at least one further full image with at least one offset that differs from the first offset.

The fringe pattern in an interferometer arises as a result of an inclination of two beams relative to one another. In the case of plane waves in the beams, an equidistant fringe pattern then arises thus, with the fringe spacing depending on the angle of inclination of the two beams with respect to one another. In the case considered here, the light is focused in the interferometer, with the focus lying in the "prismatic" deflection mirror. Then, this focus is the light source which is collimated by the subsequent lens L2 such that virtually plane waves arise again—said waves, however, also carrying object information. The location of this light source can be displaced by the lateral offset in the prismatic deflection mirror; this then influences or sets the beam inclination of the collimated beam.

According to a second aspect, a method for capturing a full image that contains superposed information components of different imaging modes and that was measured by means of an apparatus according to the invention, for example, a digital holographic microscope, said full image being of, for example, a biological cell structure, a cell agglomerate, a medical sample and/or solids, sediments and/or microcrystals in bodily fluids and/or secretions, in the object space, is proposed, including the computer-device-implemented steps of variably setting an offset, in particular, by way of tilting a birefringent plate.

According to a third aspect, a method for combined evaluation of a full image, for example, of a biological cell structure, measured by means of an apparatus according to the invention, for example, a digital holographic microscope, said method using a first and second capturing device in the object space, is proposed, wherein the polarization effect of the biological cell structure is determined by means of a computer device.

According to a fourth aspect, a method for characterizing a sample is proposed, wherein the sample is measured using an apparatus according to the invention.

Offset means, in particular, a time-of-flight difference with which wavefronts of coherent light, in particular, are spatially displaced or offset from one another. So, according to this application, a set offset brings about a directional change of wavefronts, towards one another in this case, by means of an optical element, for example, a lens, in such a way that wavefronts are superposed at an angle. Such an angle is referred to as a "shear" angle. Offset and angle are physically related to one another, in particular, by way of the focal length of the lens bringing about the directional change. By way of example, the physical relationship can be described by the relation "angle is proportional to the quotient of offset/focal length of the lens."

The novel proposed solution consists of selecting a different beam offset for the different polarization directions of the light field for increasing the uniqueness range of the interferometric measurement in the interferometer, said beam offset then leading to different fringe widths in the interferogram when superposing beams that are inclined in relation to one another. As a greater beam offset is chosen in the interferometer shown in the example, the fringe widths or the fringe spacing decrease.

The advantage of the proposed system consists of a measurement system with an extended measurement range already being realizable with only a few additional components—namely, the birefringent plate, the polarizing beam splitter, and the additional camera. An extension with a plurality of wavelengths is possible. Moreover, the intensity ratio for the images with the different polarization directions can be set by way of the relative alignment of the polarization of the incident light. If the incident light is not polarized, a polarizer can additionally be provided in the beam path for the purposes of setting the intensity.

On account of the above-described asymmetry, an advantage arising here is that an image component is also present in one of the channels made of the pure intensity image. The relative component of this intensity image increases with increasing shear angle for this polarization direction.

Further advantageous configurations are claimed in conjunction with the dependent claims.

According to an advantageous configuration, a first imaging beam path can be produced for a first imaging mode, and a second imaging beam path can be produced for a second imaging mode, wherein both paths are at least partly superposed, and data of a full image are processable in a computer device and, in particular, storable in a memory device.

According to a further advantageous configuration, the first imaging mode can be produced by means of an interferometer and the second imaging mode can be produced by means of a microscope.

According to a further advantageous configuration, the first imaging mode can produce an image with beam splitting with shear in a first direction, and the second imaging mode can produce an image with beam splitting with shear in a second direction. According to certain embodiments, the beam splitting for the imaging modes can be implemented here by means of an amplitude and/or phase grating, in particular, a linear grating, and/or a birefringent optical element. According to certain embodiments, a birefringent optical element is used to split the beams (with the shear). According to certain embodiments, a birefringent optical element is arranged upstream and/or downstream of the amplitude and/or phase grating in the beam direction.

According to a further advantageous configuration, the device for producing the at least one further full image can have a birefringent optical element.

According to a further advantageous configuration, the device for producing the at least one further full image can be a birefringent plate which comprises calcite, in particular.

According to a further advantageous configuration, the birefringent plate can have a plane-parallel or wedge-shaped embodiment.

According to a further advantageous configuration, the birefringent plate can be positioned in the second imaging beam path.

According to a further advantageous configuration, the birefringent plate can be positioned in the second imaging beam path upstream of an offset mirror in such a way that beams to and/or from the offset mirror pass through the birefringent plate.

According to a further advantageous configuration, the device for producing the at least one further full image can be a birefringent material layer on an offset mirror.

According to a further advantageous configuration, the apparatus, in particular, as a digital holographic microscope, can be created as a Michelson-type or as a Mach-Zehnder-type construction.

According to a further advantageous configuration, a polarizing beam splitter can be arranged in the first imaging beam path downstream of the interferometer.

According to a further advantageous configuration, a first capturing device can capture the first full image and a second capturing device can capture a second full image at the same time in the beam paths downstream of the polarizing beam splitter.

According to a further advantageous configuration of the method according to the invention, the focus can be digitally passed through the measured full image.

BRIEF DESCRIPTION OF THE DRAWINGS

The invention will be described in more detail in conjunction with the figures on the basis of exemplary embodiments. In the figures.

The attached figures should elucidate embodiments of the present invention and impart further understanding of same. In conjunction with the description, these serve to explain concepts and principles of the invention. Other embodiments and many of the aforementioned advantages arise in view of the figures. The elements of the figures are not necessarily illustrated true to scale in relation to one another. Elements, features, and components that are the same, functionally the same, and act the same are in each case provided with the same reference sign in the figures, provided nothing else is specified.

DETAILED DESCRIPTION

Figure 1:
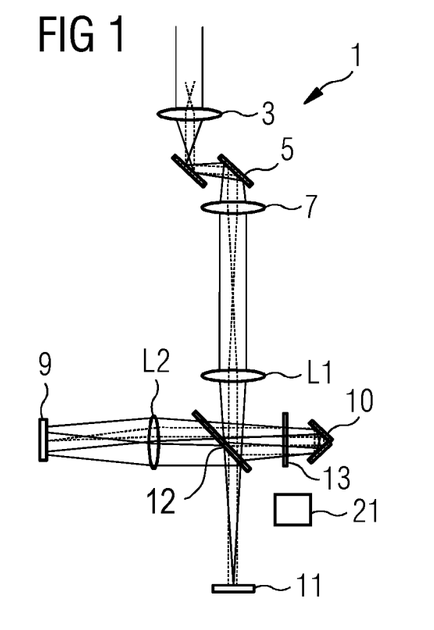
FIG. 1 shows a first exemplary embodiment of a digital holographic microscope DHM according to the invention.

FIG. 1 shows an example embodiment of a capturing device in a configuration of a digital holographic microscope. Advantageously, a small fringe pattern with a large fringe density is to be had. In Fourier space, as an exemplary embodiment of a conjugate space, this spreads the first orders of the fringe pattern from the zeroth order. The high frequency of the fringe pattern overlaps with the frequency content of the respective object images, which may be images of cells, for example, as are illustrated in accordance with FIG. 13, for example. The fringe pattern can be separated out of a full image again by means of further methods. To this end, novel methods use a large spread of a first and a zeroth order component in a Fourier image according to FIG. 14, wherein a "synthetic" Fourier space can be magnified in a cropped portion, as a result of which a high spatial resolution of the reconstructed image arises or is rendered possible.

FIG. 1 shows a digital holographic microscope 1 having a first imaging beam path for an interferometer for producing a fringe pattern, and a second imaging beam path for producing a microscopic image, with both paths being superposed and data of a measurement image being able to be processed in a computer device and, in particular, being able to be stored in a memory device. An objective lens 3 is arranged on the object side, the objective lens passing an imaging beam from an object, e.g., a cell, to a camera or capturing device 9 via a mirror system 5 and a tube lens 7 and also a beam splitter 12 and lenses L1 and L2, with 11 denoting a point mirror. Reference sign 10 denotes an offset mirror. Here, offset means a lateral displacement (time-of-flight difference), with which wavefronts of coherent light are spatially displaced or offset in relation to one another. A birefringent plate 13 as an optical element that sets the offset is positioned in the second imaging beam path to and from the offset mirror 10. The birefringent plate 13 is positionable and movable, in particular, rotatable or tiltable, by means of a positioning device 21. It is possible, in particular, to produce a fringe pattern or line pattern. Cutting-out or "cropping" means, in particular, image processing in which components of a conjugate image or transformed object image, in particular, a Fourier image, are cropped.

The use of a birefringent plate that is cut from a birefringent crystal with a suitable orientation is proposed for the purposes of splitting the light beam in the one arm of the interferometer. The plate can have a plane-parallel or a wedge-shaped embodiment. The split depends on the orientation of the optical axis in the birefringent crystal and on the thickness of the material. Splitting of the beams can be set finely by tilting the plate in the beam. As a result of the plane-parallel plate, the beams with the different polarization directions are only subjected to a lateral offset. If the plate has a wedge-shaped embodiment, angle splitting also occurs, depending on the direction of the wedge. Then, there is a further change in the fringe pattern in the interferogram as a result of angle splitting.

Then, the beams split thus are superposed with a reference beam in the interferometer. A fringe pattern arises, with the fringe spacing depending on the angle (shear angle) between measurement beam and reference wave. In the present example, the lateral offset by means of a lens L2 brings about an angle between the wavefronts of the produced collimated beam.

Then, a polarizing beam splitter is installed in the beam upstream of the camera. The polarization split by the beam splitter and the direction of the optical axis in the birefringent crystal should be adjusted or aligned in relation to one another in order to obtain ideal results.

In the structure, there also is an asymmetry for the beams where the polarization vectors are parallel on account of the wedge angle between the superposed (collimated) beams and the beams where the polarization vectors include a small angle with one another. On account of the small angle, the interferogram then has a small background of a non-interfering intensity image for the image of the fringe pattern of the interferogram.

If the light source for illuminating the optical system is unpolarized in the figure, the alignment thereof is irrelevant. However, if the light source is polarized or at least partly polarized, the ratio of the intensities of how the light is split among the two cameras then can be set by way of rotating the polarization device of the light source relative to the axis directions of the birefringent plate or the polarization planes of the beam splitter.

Each of the images with the different fringe spacing is then recorded by a separate camera, said cameras each being arranged in one of the beam paths downstream of the beam guide.

In principle, it is furthermore possible to also use more than one wavelength for illuminating the optical system in the figure. All the statements made above remain valid in this case. The beams of the at least two light sources are then advantageously unified along one axis.

Since the birefringence is also wavelength-dependent and, moreover, the fringe spacing also depends on the wavelength in the case of the same optical structure, two further fringe patterns then arise with each further employed wavelength—one for each of the polarization directions predetermined by the beam splitter. This can also further increase the measurement range.

An interferometer which produces two different fringe patterns by way of splitting the beam by means of polarization is proposed. As a result, an intensity information item for two mutually orthogonal polarization directions now is available for each pixel. These intensity information items can be obtained in two different ways:

Firstly, directly as a microscope image when the reference beam path is blocked and the interference pattern is consequently suppressed.

Secondly, from the reconstructed image as an amplitude image after the DHM evaluation.

Ideally, the images for the two polarization directions should be recorded with the same camera alignment or should be appropriately aligned and should also be scaled in suitable fashion after the image recording in order to avoid disturbance effects as a result of a camera alignment or incorrect image scaling.

Alternatively, it may be advantageous to suitably align the cameras along the axes but nevertheless offset the pixel patterns by half a pixel diagonal. This also allows the lateral resolution to be improved by computation using known methods of the so-called pixel-shift methods.

Two shear images with different shear angles could also be used in the chosen DHM setup with the shear interferometer in place of the two wavelengths. As a result of the different shear angles, two systems of interferences with different periods in terms of depth and also lateral spacing arise. The situation is completely comparable to the situation when producing a synthetic wavelength by means of two wavelengths. Here, too, the uniqueness range increases to the smallest common multiple of the period of the interference pattern of the two shear interference systems. The parameters that are freely selectable here are the shear angle of the two interference systems or the difference angle thereof.

Figure 2:
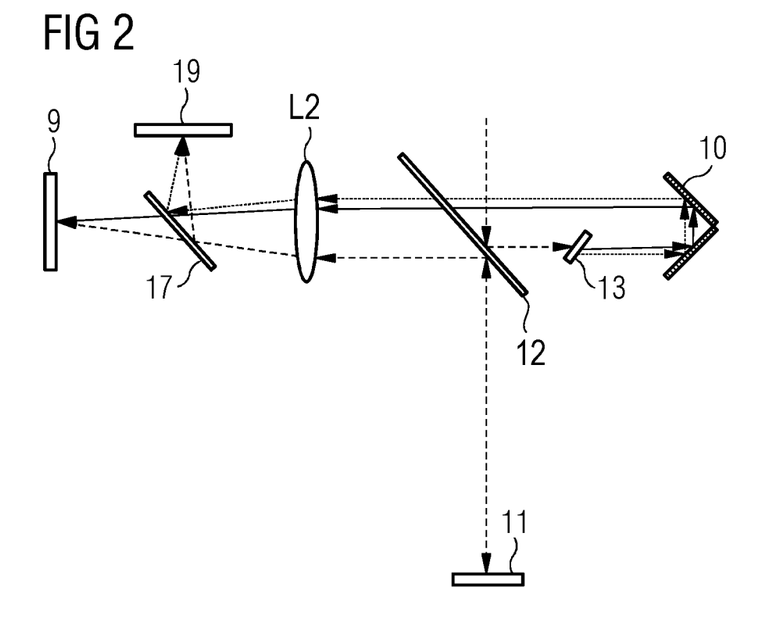
FIG. 2 shows a first exemplary embodiment of an offset interferometer according to the invention.

FIG. 2 shows a first exemplary embodiment of an offset interferometer according to the invention, in particular, as a constituent part of a digital holographic microscope 1 according to FIG. 1. This DHM has been created as a Michelson-type structure. A polarizing beam splitter 17 is arranged in the first imaging beam path downstream of the interferometer. In the beam paths downstream of the polarizing beam splitter 17, a first capturing device 9 captures the first full image, and a second capturing device 19 captures a second full image at the same time. The device for producing the at least one further full image is a birefringent plate 13, which consists of calcite in particular. Here, the birefringent plate 13 has a plane-parallel embodiment and, alternatively, can also have a wedge-shaped embodiment.

Depending on where the beam is split in the beam path, said beam can be still magnified even more at the following optical unit. This can be seen well in FIG. 2. If the beam splitter plates are introduced in a divergent beam, they always also have an effect on the imaging aberrations, in particular on the spherical aberration. These effects are not illustrated in the symbolized beam paths. The beam guidance, too, is only illustrated schematically in the plane. In reality, it may be necessary to leave the plane of the drawing under an orientation of 45 degrees with the polarizing beam splitters and the structure must be extended into 3D.

Figure 5:
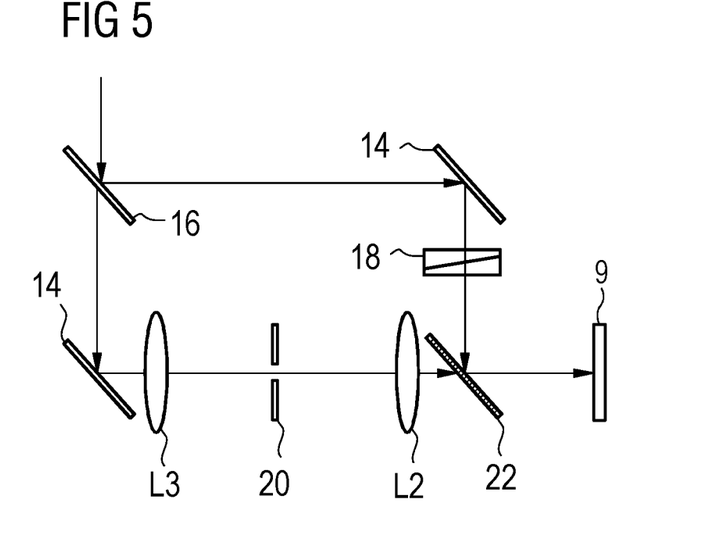
FIG. 5 shows a fourth exemplary embodiment of an offset interferometer according to the invention.

FIGS. 2 and 5 show that the proposed modifications are applicable in various interferometer types. The light beam is split at a suitable location in the interferometer and at least one of the two parts of the light beam is laterally offset. This beam offset then causes different interferograms to arise in the image plane for the two beam components.

If the reference wave is produced in the interferometer by way of a pinhole aperture or a punctiform mirror, it is advantageous if the lateral offset is produced at a point such that one reference mirror can continue to be used for both interferograms.

Implementing the splitting of the beam by means of birefringence is proposed to produce exactly two different interferograms. In the case of a non-polarizing beam splitter, it is no longer possible in the further course of the beam path to completely separate the two partial beams and hence completely decouple the interference pattern. Rather, there even is the risk of the at least three waves then interfering with one another in pairwise fashion, leading to a superposition of three interference patterns. These three patterns can only be separated with much outlay.

In the proposed preferred embodiment with polarizing beam splitting, a polarizing beam splitter then can be provided in front of the camera, said beam splitter separating the two interference systems and dividing these among the two different cameras. Consequently, the two interference systems can be recorded simultaneously if the exposure times of the two cameras are synchronized. Alternatively, provision could be made of only one camera and an element for selecting the polarization, such as a polarization filter or beam splitter, which allows selection of the desired polarization direction. Here, electro-optic components for selecting the polarization direction would also be conceivable, or the element for selecting the polarization direction is rotated/brought into the desired polarization position.

If the images are recorded in series, it would just as easily be possible to simply displace the actuating unit for setting the angle, which may likewise be referred to as shear, between the recordings. The shear can be calculated directly from the image with the interference fringes if the wavelength is known.

If the light beams for producing the interferograms have polarization vectors for the linear polarization that are not perpendicular to the plane in which the beams are "sheared" or oriented in relation to one another with an angle, the image is not completely modulated on the camera. Even if the angles are small in this case, certain small components of each of the individual shared beams remain in the intensity image and are superposed on the camera with the interference pattern. This effect can be influenced by selecting the geometric design of the structure for the polarization device and the shear plane, and hence the component of the intensity pattern in the image can be determined. The intensity component of the reference beam can be compensated for by calculation in the evaluation as it is known from the recordings of the reference image. Then, only the superposition of interference pattern and microscopic image of the object still remains in the camera image. Setting the intensity ratios of the two images is helpful in order to have available a sufficient amount of information or signal even for the representation of small structures, as may occur in white blood cells, for example.

Below, reference signs that are the same as the reference signs above denote the same component parts.

Figure 3:
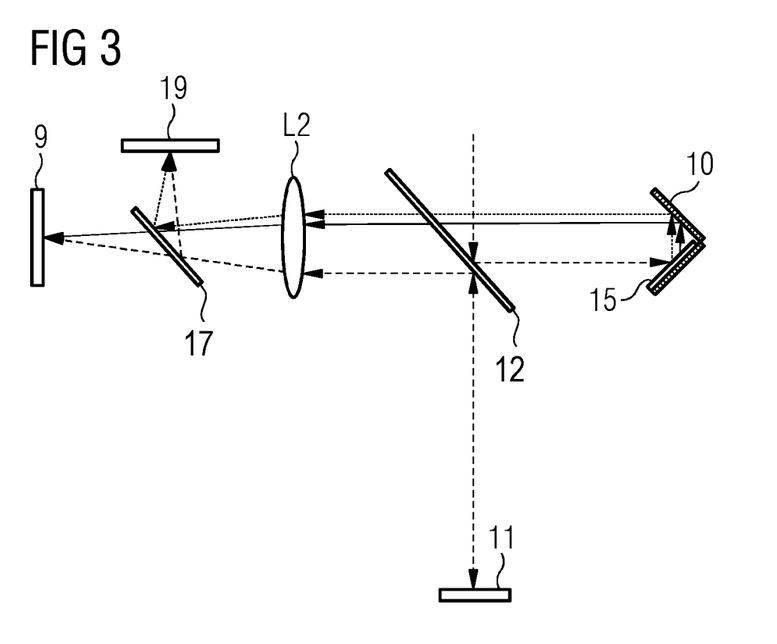
FIG. 3 shows a second exemplary embodiment of an offset interferometer according to the invention.

FIG. 3 shows a second exemplary embodiment of an offset interferometer according to the invention, in particular, as a constituent part of a digital holographic microscope 1 according to FIG. 1. The device for producing the at least one further full image is a birefringent material layer 15 on an offset mirror 10 in this case.

Figure 4:
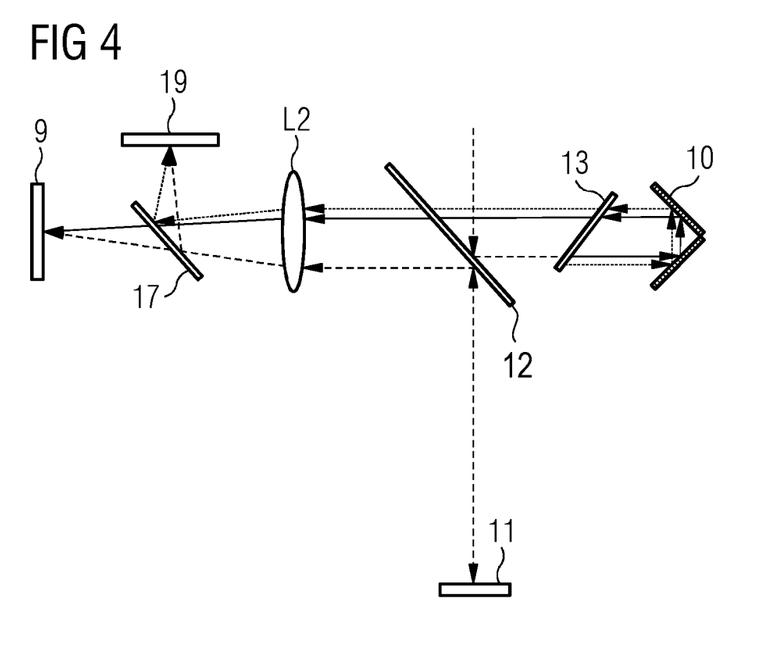
FIG. 4 shows a third exemplary embodiment of an offset interferometer according to the invention.

FIG. 4 shows a third exemplary embodiment of an offset interferometer according to the invention, in particular, as a constituent part of a digital holographic microscope 1 according to FIG. 1. Here, the birefringent plate 13 is positioned in the second imaging beam path to and from an offset mirror 10.

FIG. 5 shows a fourth exemplary embodiment of an offset interferometer according to the invention, in particular, as a constituent part of a digital holographic microscope 1 according to FIG. 1. Here, an offset interferometer constituent part is created as a Mach-Zehnder-type structure and includes two mirrors 14, a beam splitter 16, a beam path length symmetrization unit 18, a pinhole aperture 20, a beam splitter 22 (used for combining beams), and lenses L2 and L3.

Figure 6:
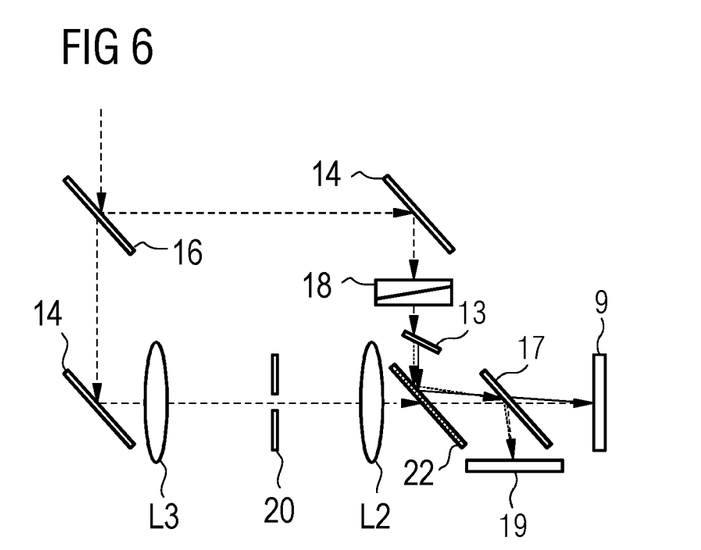
FIG. 6 shows a fifth exemplary embodiment of an offset interferometer according to the invention.

FIG. 6 shows a fifth exemplary embodiment of an offset interferometer according to the invention, in particular, as a constituent part of a digital holographic microscope 1 according to FIG. 1. Here, a birefringent plate 13 is arranged in a beam path downstream of a beam path length symmetrization unit.

Figure 7:
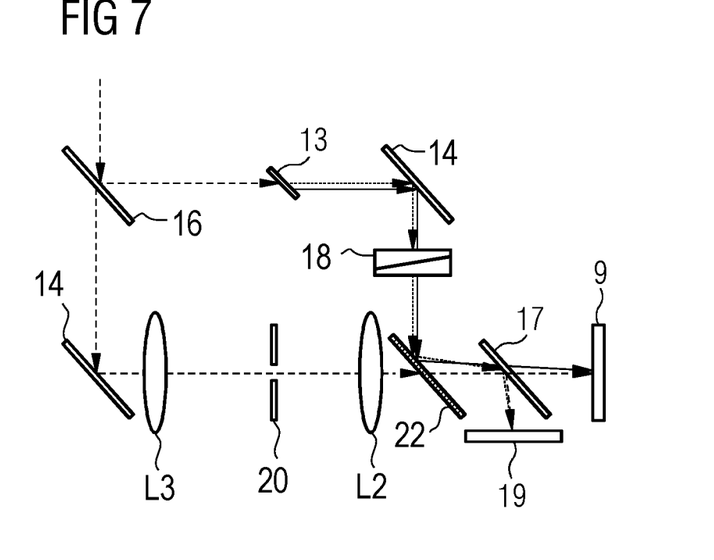
FIG. 7 shows a sixth exemplary embodiment of an offset interferometer according to the invention.

FIG. 7 shows a sixth exemplary embodiment of an offset interferometer according to the invention, in particular as a constituent part of a digital holographic microscope 1 according to FIG. 1. Here, a birefringent plate 13 is arranged in a beam path upstream of a beam path length symmetrization unit.

Figure 8:
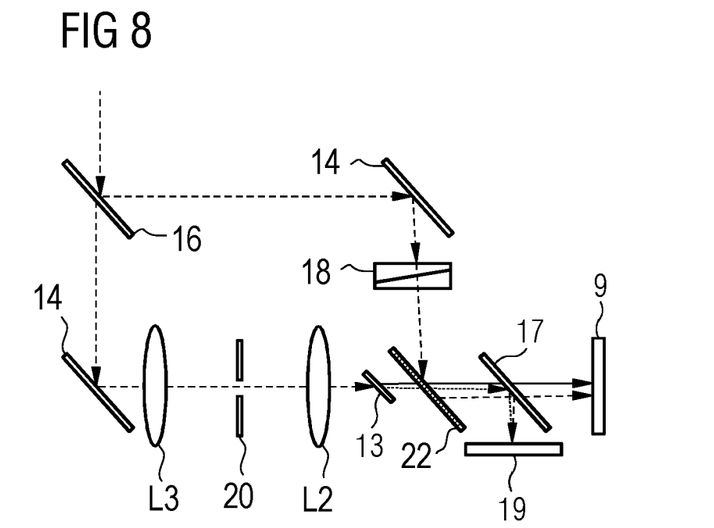
FIG. 8 shows a seventh exemplary embodiment of an offset interferometer according to the invention.

FIG. 8 shows a seventh exemplary embodiment of an offset interferometer according to the invention, in particular, as a constituent part of a digital holographic microscope 1 according to FIG. 1. Here, a birefringent plate 13 is arranged in a beam path upstream of the beam splitter.

Figure 9:
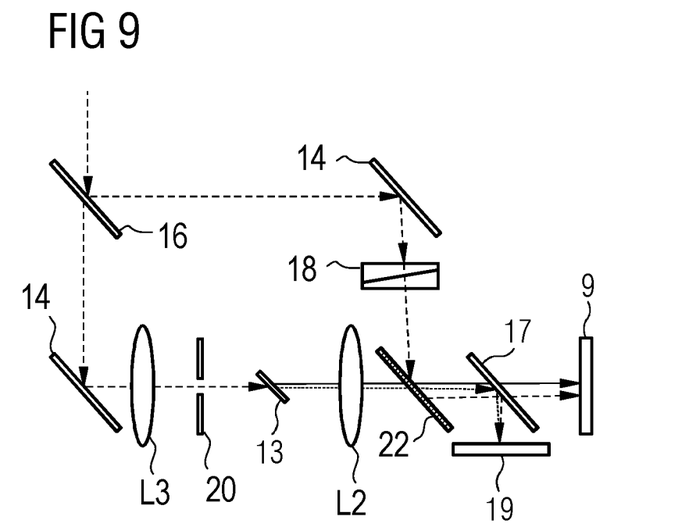
FIG. 9 shows an eighth exemplary embodiment of an offset interferometer according to the invention.

FIG. 9 shows an eighth exemplary embodiment of an offset interferometer according to the invention, in particular, as a constituent part of a digital holographic microscope 1 according to FIG. 1. Here, a birefringent plate 13 is arranged in a beam path downstream of a point mirror.

Figure 10:
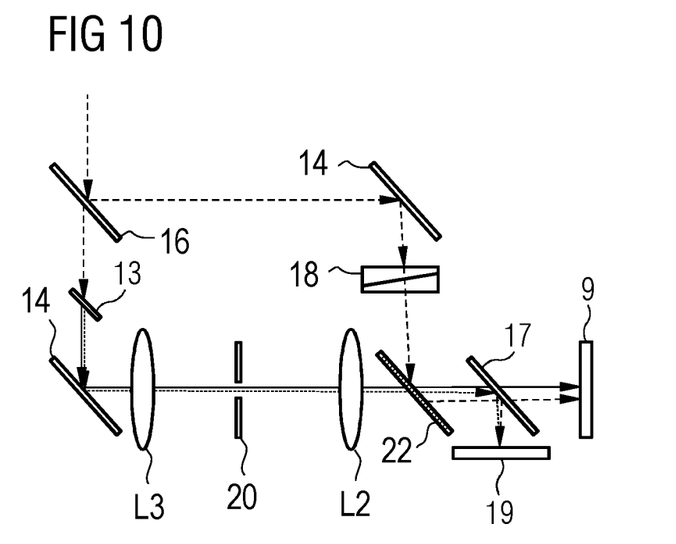
FIG. 10 shows a ninth exemplary embodiment of an offset interferometer according to the invention.

FIG. 10 shows a ninth exemplary embodiment of an offset interferometer according to the invention, in particular, as a constituent part of a digital holographic microscope 1 according to FIG. 1. Here, a birefringent plate 13 is arranged in a beam path upstream of a point mirror.

Figure 11:
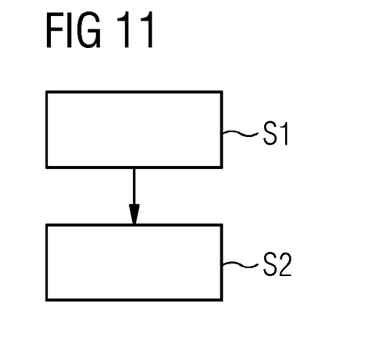
FIG. 11 shows an exemplary embodiment of a method according to the invention.

FIG. 11 shows an exemplary embodiment of a method according to the invention. Steps of variably setting an offset, in particular, by means of tilting a birefringent plate, are carried out by means of a computer device, wherein a first offset is produced in a first step S1 and a second offset is produced in a second step S2.

Figure 12:
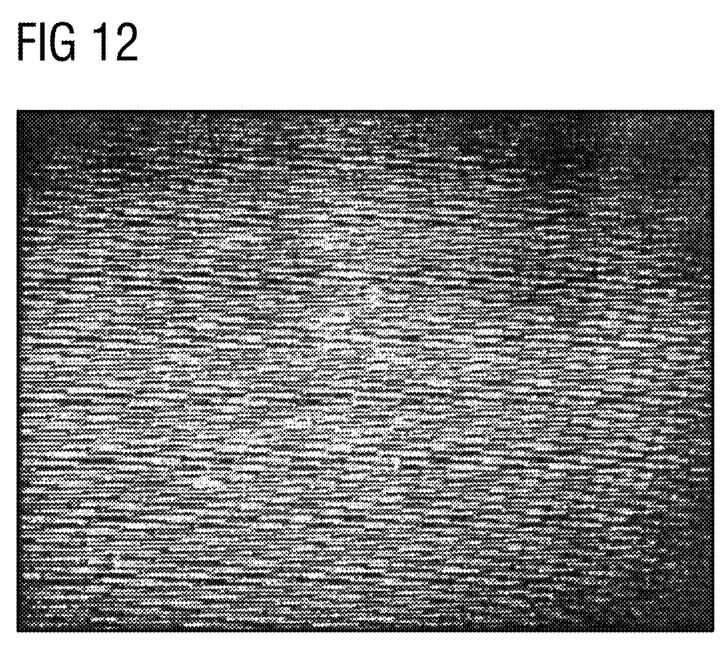
FIG. 12 shows an example of a raw image of a fringe pattern.

FIG. 12 shows a representation of a raw image of a fringe pattern assigned to an interferometer. This image could have been produced by means of a capturing device according to the invention.

Figure 13:
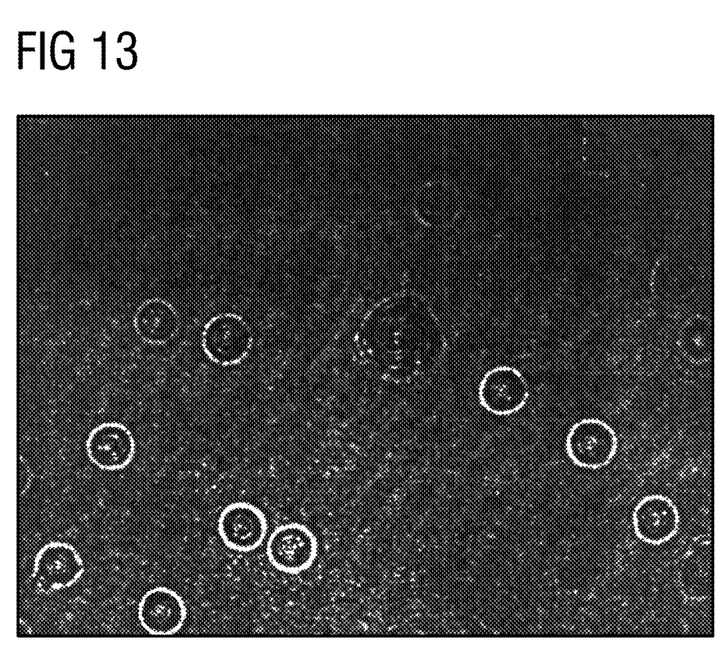
FIG. 13 shows an example of an image of an object without a fringe pattern.

FIG. 13 shows a representation of an image of biological cells as an exemplary embodiment of an object, to be precise without a fringe pattern. This image could have been produced by means of a capturing device according to the invention. Such an image has a high resolution in the image plane.

Figure 14:
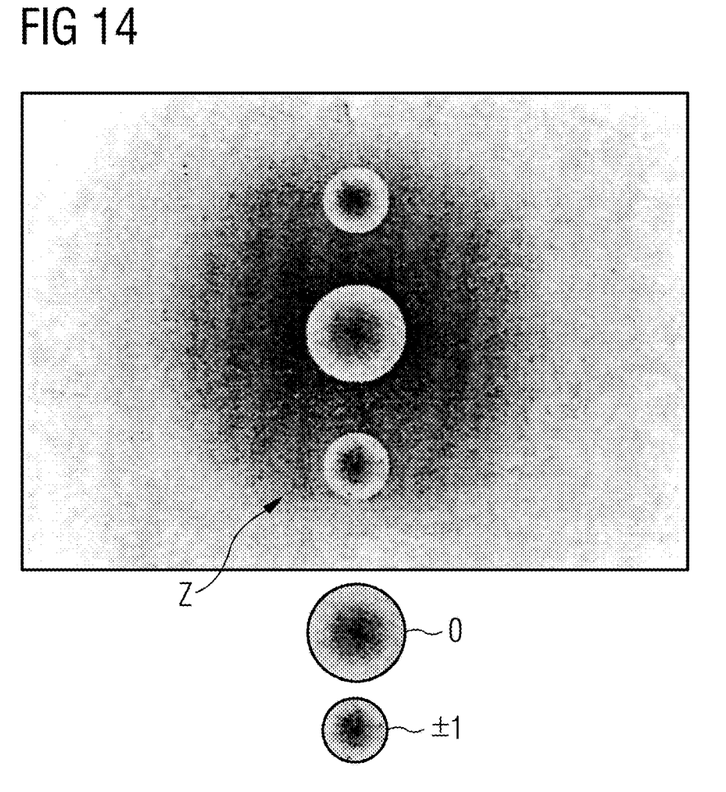
FIG. 14 shows an example of a conjugate image.

In an exemplary fashion, FIG. 14 shows a typical representation of Fourier images of measured full images of biological cells. This image can be produced from the measured full image by means of a computer device according to the invention. The arrow points to a circular diffraction image or diffraction pattern Z of a biological cell. The central circle represents the zeroth order of diffraction 0 and the upper and the lower circle represent a symmetrical first plus 1+ and minus 1− order of diffraction.

FIG. 14 shows an exemplary embodiment of a conjugate image in the form of a Fourier image, in this case, for example, from a measured full image of a cell structure, with the Fourier image having two imaging components, to be precise one of a fringe pattern with three points in real space, and one of an object, to be precise a cell structure in this case, which is centered on a zero of the three points in real space. The invention facilitates an effective separation of the two imaging components or imaging modes in the Fourier image from one another. The three points in real space of the fringe pattern are symmetric in relation to the central point for each of the fringe patterns. The pattern of the object depends on its spatial frequency content. Therefore, the radial distance from the origin is relevant for reproducing the inner structure of the object. The pattern of the object is only symmetrical to the central zero of the zero frequency of the Fourier plane.

Figure 15:
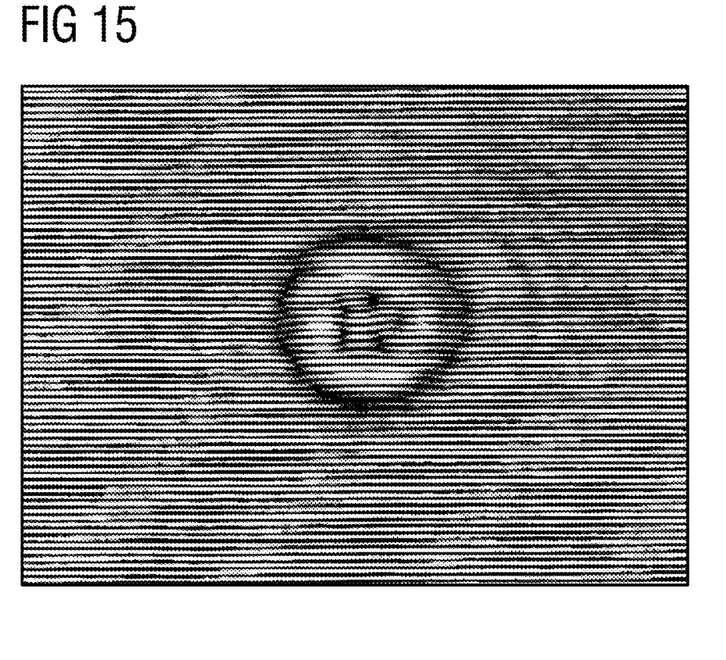
FIG. 15 shows an example of a full image with a first offset.

FIG. 15 shows an example of a full image with a first offset.

Figure 16:
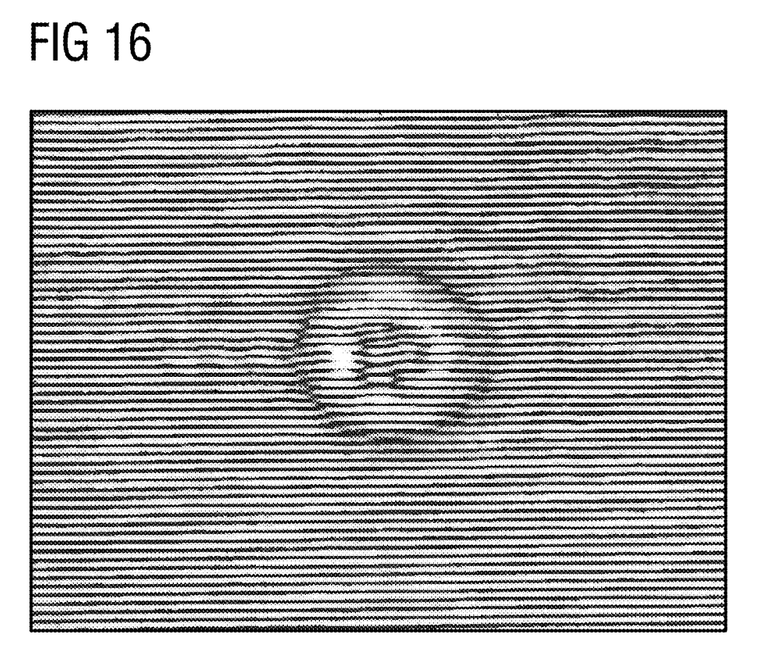
FIG. 16 shows the example of the full image with a second offset.

FIG. 16 shows an example of the full image according to FIG. 15 with a second offset.

Figure 17:
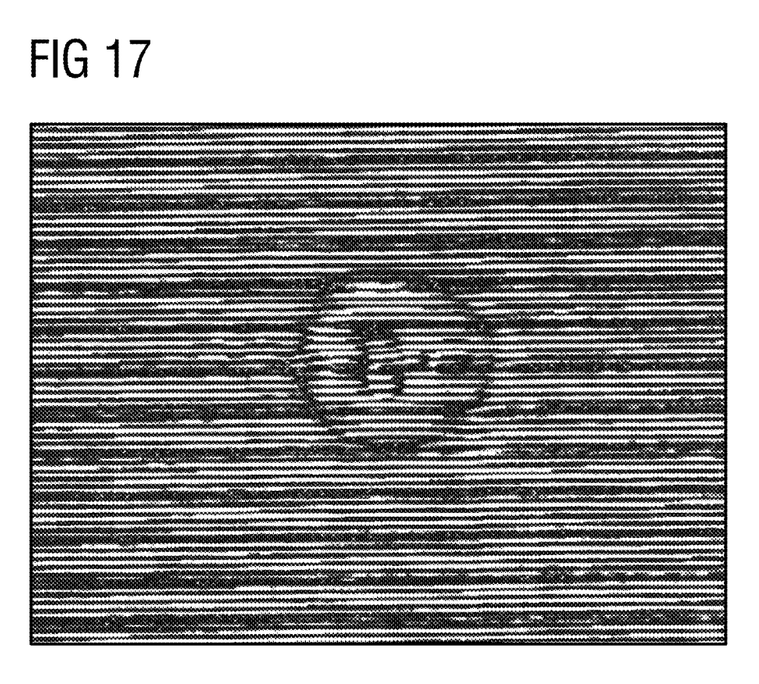
FIG. 17 shows the example of the full image with a third offset.

FIG. 17 shows an example of the full image according to FIG. 15 when the full image is recorded simultaneously with two different beam offsets, which are superposed.

In this FIG. 17, it is possible to see a long-wavelength pattern of the synthetic shear or angle and, therein, a short wavelength pattern with a lower contrast made of the superposition of the two short wavelength patterns. The long wavelength structure can also be used for phase unwrapping with the extended depth range, in a manner analogous to that with synthetic wavelengths.

By way of example, important preferred control variables in the structure are:

Coherence length: large enough for the measurement range, not too large on account of bothersome interferences by scatter in the beam path.

Shear angle: large enough for sufficiently dense line patterns, not too large so that the coherence of the light source suffices to produce an interference pattern with sufficient contrast over the entire detector.

A polarizing beam split, where present, is added to the shear split. The splitting effect can be partly averaged out between the two polarization directions during the adjustment of the setup. There can optionally be further compensation by way of a suitable selection of slow and fast axis during the split. Typically, the slow axis lies in such a way that this beam extends along the inner path.

When illuminating the DHM, care should preferably be taken that this illumination is either unpolarized or, in the case of complete or partial polarization, set as close as possible to 45 degrees in relation to the axes subsequently used for beam splitting. The intensity can also be split among the two beam paths by way of the polarization; moreover, this can be used to increase the dynamic range in the measurements. Thus, for example, the measurement ranges of cameras with a nonlinear sensitivity—so-called lin/log cameras—can be combined and hence the linear range can be extended by a factor of 2, for example. As an alternative or in addition thereto, HDR—high dynamic range—technology may also be used for the camera.

By selecting the polarization direction in the case of linearly polarized light sources or by way of the preferred direction of the polarization in the case of partly polarized light sources, it is also possible to influence, to a certain extent, the contrast for the components of the object wave from the microscopic image. If the optical unit is configured so as not to maintain the polarization, then the forward direction can also be made dependent on the beam path and such effects should be taken into account when adjusting the system. This effect is only mentioned here as a matter of principle, as it may have a certain influence on the quality of the measurement.

For the purposes of combining the fringe images with different fringe periods by calculation, the fringe patterns should preferably have the same amplitude or, alternatively modulation. This can be achieved by way of suitable scaling of the images relative to one another. Within the scope of this scaling, it is then also possible to compensate the deliberately set intensity differences in order to obtain a best-possible synthetic fringe pattern. What should be noted here is that the pattern is good enough to be able to use the synthetic fringe pattern for so-called phase unwrapping. Then, for the precise phase evaluation, it is possible to use the fringe pattern which has a better signal-to-noise ratio at the respective measurement location. Thus, high resolution measurements are possible, despite the dynamic adaptation or dynamic extension.

If more than two fringe patterns that can be detected independently of one another are required, the beam path can be split upstream of the interferometer and the split beam can be guided to a second interferometer with, once again, up to two patterns and two cameras. Thus, the synthetic measurement range achievable by way of the fringe patterns can be significantly expanded. What should be taken into account here is that the depth-of-field range of the imaging optical unit is restricted. Then, the second interferometer can also be set in focus on a different object plane, independently of the first interferometer.

Besides or additionally, it is also possible for an image with beam splitting with shear in a first direction to be produced with the first imaging mode and an image with beam splitting with shear in a second direction to be produced by the second imaging mode.

Here, the beam splitting for the imaging modes can also be implemented, for example, by means of an amplitude and/or phase grating, for example, a diffraction grating, with no particular restrictions, and/or a birefringent element. According to certain embodiments, a birefringent optical element, e.g., the birefringent plate 13 and/or the birefringent material layer 15, is arranged upstream and/or downstream of the grating in the beam direction. However, according to certain embodiments, a birefringent optical element, e.g., the birefringent plate 13 and/or the birefringent material layer 15, is used for splitting the beams (with the shear).

Additionally, an image with beam splitting with shear in a first direction can be produced by the first imaging mode and an image with beam splitting with shear in a second direction can be produced by the second imaging mode if a plurality of birefringent optical elements, e.g., 2, 3, 4, or more optical elements, are used. Then, these can have different arrangements, for example, e.g., at a rotational angle, e.g., 90°, wherein the birefringent optical elements can rest against one another or else can be separated from one another and be situated at different positions in the beam path. Here, the birefringent optical elements can be, for example, those specified according to the invention.

A further advantage of the two interferometers arises if both interferometers are arranged with mutually orthogonal shear planes. As a result, the contour is imaged with and without shear for each object point in at least one direction.

The path illustrated here with the two interferometers can theoretically be extended to n interferometers—optionally with the aforementioned boundary conditions. The split of the beam path can be implemented by splitting the intensity with predetermined split ratios, with beam splitting by means of polarization or in dichroic fashion according to the wavelength of the light, or else in mixed forms thereof.

Different samples can be measured using the apparatus according to the invention. Consequently, the present invention also relates to the measurement of a sample using the apparatus according to the invention. In particular, a depth measurement at the sample can also be implemented in the process.

The apparatus according to the invention facilitates an improved capture of samples with an improved uniqueness range in the measurements. This is advantageous, particularly in the case of biological and/or medical samples.

Here, a sample is a sample containing an object for which a measurement using the apparatus according to the invention is of interest. Here, no particular restrictions are placed on the sample and it can be provided in any suitable fashion, for example, as an in-vitro and/or in-vivo sample in the case of a medical sample. Here, in particular, the sample can comprise biological and/or medical samples, which have no particular restrictions placed thereon.

Here, biological samples are samples that are derived from a living being, for example, an animal (including humans), a plant, a fern, a fungus, etc., for example, cells, clusters of cells, cell agglomerates, etc. Here, no particular restrictions are placed on the origin of the biological sample. Carrying out a pretreatment on the biological sample, e.g., washing, isolating, fixating, etc., before carrying out a measurement using the apparatus according to the invention is not precluded either, for example, when producing thin-layer or thick-layer samples. By way of example, using thin-layer technology, it is possible to capture monolayers of cells, while superpositions of a plurality of cells of the same or a different type can also be captured using the thick-layer technology.

By way of example, medical samples are samples derived from a bodily fluid, or from tissue samples, e.g., tissue sections, for example, within the scope of pathology or histology. Here, there are no restrictions on the bodily fluids and these comprise fluids, emulsions and/or suspensions which have their origin in bodies of living beings, for example, from patients, too. These may comprise all liquids that are excreted by a body or circulated therein. Examples of bodily fluids include bodily fluids such as blood, urine, saliva, plasma, serum, etc., and also secretions. By way of example, the sample may originate from a patient, i.e., it is, for example, a clinical isolate. Here, for example, the sample may originate from vertebrates, i.e., it also relates to veterinary medicine, but it may also be a sample of a human. By way of example, it is also possible to measure solids, sediments and/or microcrystals in such bodily fluids and/or secretions.

A sample still being treated prior to the measurement with the apparatus according to the invention, for example, filtered, extracted, washed, thinned, mixed with reagents, etc., is not precluded within the scope of the method according to the invention.

Additionally, various methods are disclosed, by means of which a full image that is obtained within the scope of the measurement method according to the invention is analyzed further in respect of the information contained therein.

Thus, a method is disclosed for capturing a full image that contains superposed information components of different imaging modes and that was measured by means of an apparatus, for example, a digital holographic microscope, said full image being of, in particular, a sample, for example, a biological cell structure, a cell agglomerate, a medical sample and/or solids, sediments and/or microcrystals in bodily fluids and/or secretions, in the object space, including the computer-device-implemented steps of variably setting an offset, in particular by way of tilting a birefringent plate (13).

Here, like in the other methods according to the invention, too, no particular restrictions are placed on the computer device.

There are no particular restrictions placed on the sample in this method and said samples comprise, for example, samples for medical and/or biological applications, for example, bodily fluids or secretions, in particular, undiluted bodily fluids or secretions, which may contain both agglomerates of cells and substance accumulations in the form of sediments or else solids such as microcrystals, for example, in urine, saliva, or bile. In particular, an extended depth measurement range is of particular use for the measurement of undiluted fluids or secretions since this can achieve measurement capability even if the cells at least partly overlap.

Moreover, a depth measurement is also of interest in the case of thin-film or thick-film examinations, for example, of blood, and in tissue sections. Here, cells may be present in suspension or in dried form on solid or flexible substrates (e.g., glass or plastic). In this respect, the sample may also be a thin film, a thick film, or a tissue sample in the case of measurements with the apparatus according to the invention. Here, for example, cells or tissue components can be identified and differentiated.

Additionally, it is also possible, according to the invention, to measure large cells, cell clusters, and/or deposits or solids and microcrystals in bodily fluids and secretions, and analyze these in the full image. Likewise, it is possible to resolve temporal processes, for example, using the method according to the invention by way of consecutive measurements, for example, blood coagulation processes, e.g., the formation of cell agglomerates from platelets.

The measurement in the measurement method according to the invention can be implemented with one wavelength or with a plurality of different wavelengths.

An extension of the measurement range with the same wavelength during the measurement has a great advantage here, in particular, in relation to a synthetic wavelength made of different fundamental wavelengths, namely that possible measurement errors on account of material dispersions are minimized or avoided. Furthermore, possible absorption bands which are present, e.g., in the sample, e.g., a fluid or secretion, or which are modified or introduced, e.g., by way of medicaments in the secretion or the fluid, can be minimized in terms of their effect on the measurement.

The extension of the measurement range with a wavelength is moreover advantageous in that a greater component of the visible spectrum can be used for absorption, excitation or emission in additional microscopic measurements, such as absorption measurements or fluorescence measurements, which are undertaken in synchronous fashion by means of an extended digital holographic microscope.

Additionally, a method is disclosed for combined evaluation of a full image, for example, of a biological cell structure, measured by means of an apparatus according to the invention, for example, a digital holographic microscope, said apparatus having a first and a second capturing device in the object space, wherein the polarization effect of the biological cell structure is determined by means of the computer device. Here, too, advantages when evaluating the full image therefore arise by the measurement of a sample by means of the apparatus according to the invention. The sample, by means of which the full image is produced, is however not restricted to a biological cell structure in this case but generally comprises samples in which separated imaging with different polarization directions causes an effect.

In the methods for analyzing the full image, the focus can be digitally passed through the measured full image, with the type of through focusing not being particularly restricted. By way of example, image stacks may also be measured to this end.

Here, for example, the cell nucleus can be studied from the plane of the dried cells in the case of thin films or else appropriate measurement planes of interest can be selected, for example, in the case of cell aggregates and/or crystals; by way of example, a physician may do this during a subsequent evaluation.

The aforementioned embodiments, configurations, and developments can be combined together as desired provided this is meaningful. Further possible configuration, developments, and implementations of the invention also comprise combinations of above-described features of the invention that are not explicitly mentioned. In particular, a person skilled in the art will also add individual aspects as improvements or additions to the respective basic form of the present invention.

The invention claimed is:

1. An apparatus for capturing and processing a first full image of a biological or medical sample that was measured with a first offset, comprising a device for producing at least one further full image with at least one offset that differs from the first offset, wherein the device has a first imaging beam path for a first imaging mode and a second imaging beam path for a second imaging mode, the device comprising an offset mirror and a beam splitter arranged in one direction and a point mirror arranged with the beam splitter in another direction different than the one direction, the device further comprising a birefringent optical element arranged in the one direction to set the at least one offset.

2. The apparatus as claimed in claim 1, wherein information components of the first and second imaging modes are superposed in a respective full image at an image capturing device.

3. The apparatus as claimed in claim 1, wherein both the first and second imaging beam paths are at least partly superposed, and data of a full image are processable in a computer device and storable in a memory device.

4. The apparatus as claimed in claim 3, wherein the first imaging mode is produced by an interferometer and the second imaging mode is produced by a microscope.

5. The apparatus as claimed in claim 3, wherein the first imaging mode produces an image with beam splitting with shear in a first direction, and the second imaging mode produces an image with beam splitting with shear in a second direction, wherein the beam splitting for the imaging modes is implemented via an amplitude or phase grating.

6. The apparatus as claimed in claim 1, wherein the birefringent optical element has a birefringent plate which comprises calcite, wherein the birefringent plate has a plane-parallel or wedge-shaped embodiment.

7. The apparatus as claimed in claim 6, wherein the birefringent plate is positioned in the second imaging beam path.

8. The apparatus as claimed in claim 6, wherein the birefringent plate is positioned in the second imaging beam path to or from the offset mirror.

9. The apparatus as claimed in claim 1, wherein the birefringent optical element comprises a birefringent material layer on the offset mirror, wherein the birefringent material layer has a plane-parallel or wedge-shaped embodiment.

10. The apparatus as claimed in claim 1, wherein the apparatus comprises a Michelson or a Mach-Zehnder construction.

11. The apparatus as claimed in claim 1, further comprising an interferometer, a first capturing device, a second capturing device, and a polarizing beam splitter arranged in the first imaging beam path downstream of the interferometer, wherein the first capturing device captures the first full image and the second capturing device captures a second full image at the same time in the first and second imaging beam paths downstream of the polarizing beam splitter.

12. The apparatus as claimed in claim 1, wherein the apparatus comprises an interferometer or a digital holographic microscope.

13. A method for capturing a full image that contains superposed information components of different imaging modes the full image being of a biological cell structure, a cell agglomerate, a medical sample or solids, sediments or microcrystals in bodily fluids or secretions, in object space, including computer-device-implemented steps of:
   variably setting a first offset by tilting a birefringent plate arranged in one or more beam paths comprising a beam splitter, a lens, and an image capturing device; and
   variably setting a second offset by tilting the birefringent plate.

14. A method for combined evaluation of a full image of a biological cell structure, the method comprising:
   using first and second capturing devices in object space, each of the first and second capturing devices arranged in one or more beam paths comprising a polarizing beam splitter, a lens, a second beam splitter, a point mirror, a birefringent optical element, and an offset mirror, and
   determining a polarization effect of the biological cell structure using a computer device.

* * * * *